(12) United States Patent
Peterson et al.

(10) Patent No.: US 9,239,723 B2
(45) Date of Patent: Jan. 19, 2016

(54) CONFIGURING A DEVICE BASED ON PROXIMITY TO OTHER DEVICES

(71) Applicant: LENOVO (Singapore) PTE, LTD., New Tech Park (SG)

(72) Inventors: Nathan J. Peterson, Durham, NC (US); John Carl Mese, Cary, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 312 days.

(21) Appl. No.: 13/892,669

(22) Filed: May 13, 2013

(65) Prior Publication Data

US 2014/0337607 A1 Nov. 13, 2014

(51) Int. Cl.
*G06F 9/44* (2006.01)
*H04W 4/00* (2009.01)
*H04W 4/02* (2009.01)

(52) U.S. Cl.
CPC ............. *G06F 9/4401* (2013.01); *H04W 4/001* (2013.01); *H04W 4/023* (2013.01)

(58) Field of Classification Search
None
See application file for complete search history.

(56) References Cited

U.S. PATENT DOCUMENTS

| | | | |
|---|---|---|---|
| 7,139,817 B1 * | 11/2006 | English et al. | 709/220 |
| 7,248,865 B2 * | 7/2007 | Imura | 455/421 |
| 2009/0089565 A1 * | 4/2009 | Buchanan et al. | 713/1 |
| 2011/0244837 A1 * | 10/2011 | Murata et al. | 455/414.1 |

\* cited by examiner

*Primary Examiner* — Paul Yanchus, III
(74) *Attorney, Agent, or Firm* — Kunzler Law Group

(57) ABSTRACT

An apparatus, system, and method are disclosed for associating one or more remote devices with one or more configuration parameters, the remote devices comprising one or more mobile devices, detecting one or more of the remote devices wirelessly, and setting, on a local device, one or more of the configuration parameters associated with a detected remote device.

18 Claims, 11 Drawing Sheets

CONFIGURING A DEVICE BASED ON PROXIMITY TO OTHER DEVICES

BACKGROUND

1. Field

The subject matter disclosed herein relates to configuring a device and more particularly relates to configuring a device based on proximity to other devices.

2. Description of the Related Art

In general, computing devices can be configured with a variety of settings. Display settings, storage settings, notification settings, or other settings may generally be modified by a user. Typically, a user selects menus, buttons, touch screens, or similar to modify specific settings for a computing device. A user physically interfaces with a computing device to modify a setting, or may physically interface with a computing device in order to cause a setting to change, load a profile of settings, or other. Physically interfacing may mean touching a screen on the computing device, pressing buttons on the computing device, or interfacing with the computing device through a data cable.

Physically interfacing with a computing device to affect a change may be an inefficient use of time. It may take considerable amounts of time to modify numerous settings. It may also be inconvenient to physically locate the computer device, enable an input/output interface such as a touch screen or similar, and to effectuate the changes. Additionally, as scenarios change, altering setting for a variety of different scenarios can be very time consuming.

BRIEF SUMMARY

A method for configuring a device based on proximity to other devices is disclosed. An apparatus and computer program product also perform the functions of the method.

In one embodiment, an apparatus is described that includes a processor and a memory storing machine readable code executable by the processor. In one embodiment, the machine readable code includes an association module configured to associate one or more remote devices with one or more configuration parameters. In another embodiment, the machine readable code includes a detection module configured to detect one or more of the remote devices wirelessly. In a further embodiment, the machine readable code includes a settings module configured to set, on a local device, one or more of the configuration parameters associated with a detected remote device.

In one embodiment, the machine readable code includes a determination module configured to determine distances between local device and one or more of the detected remote devices. In another embodiment, the settings module is further configured to set one or more configuration parameters based on one or more remote devices being within a threshold distance. In a further embodiment, the determination module is further configured to determine a change in one or more of the determined distances. In one embodiment, the settings module is further configured to alter one or more of the configuration parameters based on the determined change.

In one embodiment, the machine readable code includes a priorities module configured to identify one or more of the remote devices as a master remote device. In another embodiment, the priorities module is further configured to receive additional configuration parameters from the master remote device. In another embodiment, the settings module is further configured to set the additional configuration parameters. In one embodiment, one or more of the detected remote devices is a member of a group. In another embodiment, the settings module is further configured to set one or more configuration parameters associated with the group. In one embodiment, the configuration parameters include one of a notification setting, an override setting, and a state setting.

In one embodiment, one or more remote devices includes many remote devices. In a further embodiment, each of the many remote devices has a priority. In another embodiment, the setting module is further configured to set a configuration parameter associated with a remote device having a higher priority that others of the many remote devices in response to a conflict between configuration parameters.

In one embodiment, the machine readable code includes a user interface module configured to request a response from a user of the local device. In another embodiment, the settings module is further configured to set a configuration parameter based on the response.

In one embodiment, the method includes associating one or more remote devices with one or more configuration parameters. In another embodiment, the remote devices include one or more mobile devices. In a further embodiment, the method includes detecting one or more of the remote devices wirelessly. In one embodiment, the method includes setting, on a local device, one or more of the configuration parameters associated with a detected remote device.

In one embodiment, the method includes determining distances between the local device and one or more of the detected remote devices. In another embodiment, the setting one or more configuration parameters is further based on one or more detected remote devices being within a threshold distance. In a further embodiment, the method includes determining a change in one or more of the determined distances. In one embodiment, the method includes altering one or more of the configuration parameters based on the determined change.

In one embodiment, the method includes identifying one or more of the remote devices as a master remote device. In another embodiment, the method includes receiving additional configuration parameters from the master remote device. In a further embodiment, the setting one or more configuration parameters includes setting the additional configuration parameters. In one embodiment, one or more of the detected devices is a member of a group. In another embodiment, the setting one or more configuration parameters includes setting one or more configuration parameters associated with the group.

In one embodiment of the method, setting one or more configuration parameters includes one of setting a notification setting, setting an override setting, and setting a state of a user of the local device. In another embodiment, the detecting one or more remote devices includes detecting many remote devices, each detected remote device having a priority. In a further embodiment, the setting one or more configuration parameters includes setting a configuration parameter associated with a remote device having a higher priority than others of the many remote devices in response to a conflict between one or more configuration parameters. In one embodiment, the method includes requesting a response from a user of the local device. In another embodiment, the setting one or more configuration parameters is further based on the response from the user.

A program product is disclosed including a computer readable storage medium storing machine readable code executable by a processor to perform the operations. In one embodiment, the operations include associating one or more remote devices with one or more configuration parameters, the remote devices comprising one or more mobile devices. In another embodiment, the operations include detecting one or more of the remote devices wirelessly. In a further embodiment, the operations include setting, on a local device, one or more of the configuration parameters associated with a detected remote device.

In one embodiment, the operations further include determining distances to one or more of the detected remote devices. In another embodiment, the setting one or more configuration parameters is further based on one or more detected remote devices being within a threshold distance. In one embodiment, the operation of detecting one or more remote devices includes detecting many remote devices, wherein the remote devices have a priority. In another embodiment, the setting one or more configuration parameters includes setting a configuration parameter associated with a remote device that has a higher priority than other remote devices in response to a conflict between configuration parameters. In one embodiment, the operations include requesting a response from a user of the local device. In a further embodiment, the setting one or more of the configuration parameters is further based on the response from the user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
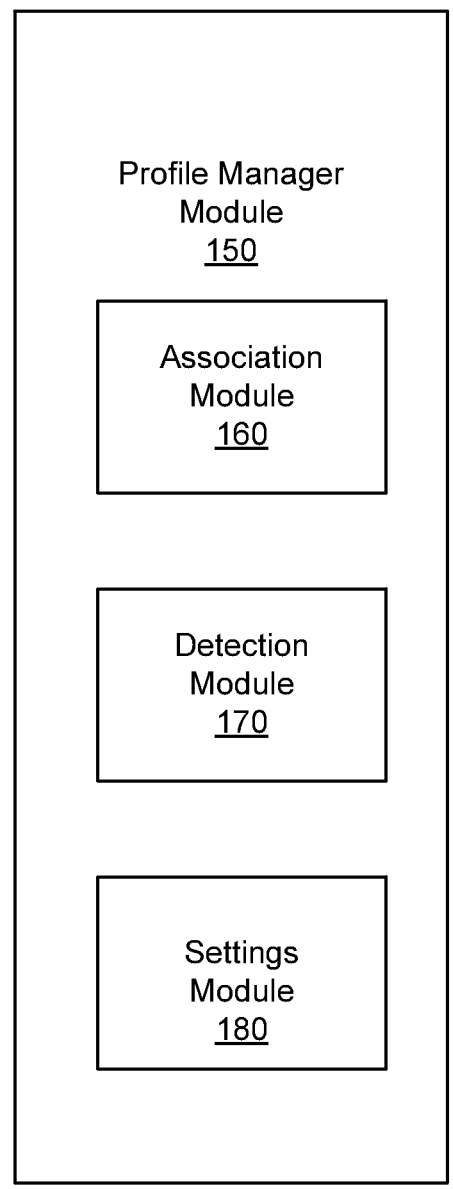
FIG. 1 is a schematic block diagram illustrating one embodiment of a profile manager module.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Descriptions of Figures may refer to elements described in previous Figures, like numbers referring to like elements.

FIG. 1 is a schematic block diagram illustrating one embodiment of a profile manager module 150. In one embodiment, a profile manager module 150 includes an association module 160, a detection module 170 and a settings module 180. In one embodiment the apparatus may include a memory storing machine readable code executable by a process. In another embodiment, the machine readable code may include the profile manager module 150.

In one embodiment, the profile manager module 150 may be configured to associate one or more remote devices with one or more configuration parameters. As described herein, configuration parameters may include a wide variety of settings or configurations for a computing device. Configuration parameters may include notification settings, sound settings, storage settings, communication settings, display settings, power settings, security settings, mode settings, or other, or the like.

Notification settings may include ringtone settings, sound settings, vibration settings, notification times, notification locations, notification for received calls, notification for received text messages, notification for other activities, or the like. Sound settings may include a silent mode, a vibration only mode, volume settings, quiet time settings, ringtone settings, user interface feedback settings, emergency settings, vibration settings, or other, or the like. In one embodiment, storage settings may include storage settings for applications, pictures, videos, music, ringtones, podcasts, downloads. Storage settings may also include available storage capacity, backup settings, restoration settings, or other, or the like. In one embodiment, communication settings may include, configuration parameters for various wired or wireless communications such as, but not limited to Wi-Fi, Bluetooth, USB, or other, or the like. Communication settings may also include call settings, sync settings, text message settings, location settings, or other, or the like. In one embodiment, display settings may include brightness, timeouts, rotation settings, font settings, light settings, user interfaces for other settings, or other, or the like. In one embodiment, power settings may include battery settings, power usage settings, display settings, or other, or the like. In one embodiment, security settings may include encryption settings, data encryption, display settings, user credentials, or other or the like.

In one embodiment, a remote devices includes a computing device that is substantially separate physically. For example, a remote device may be a computing device that is physically disconnected from a local device. In another example, a remote device may be a computing device that is connected to a local device via a wired connection, or the like. Therefore, a remote device may be physically connected to a local device. In another embodiment, a remote device may be a computing device that operates independent from the local device. In one embodiment, a remote device includes a computer device capable of communicating wirelessly with a local device. For example, a remote device may include a cellular telephone, a tablet, a media player, a game station, a wireless router, a headset, a modem, a watch, or the like. A remote device may communicate via a wireless protocol, such as, but not limited to, Bluetooth, Wi-Fi (IEEE 802.11), or other, or the like.

In one embodiment, mode settings may include airplane mode, may include communication settings, display settings, or other, or the like. Mode settings may also affect sets of other settings. For example, an airplane mode may disable some communication capabilities of a computing device. In one embodiment, various groups of settings may include similar settings and are not mutually exclusive. For example, display settings may also include power settings, or vice versa. Power settings may affect communication settings, or the like. Therefore, some settings may be affected by other settings, configuration parameters may be affected by other configuration parameters. Configuration parameters may also include override settings. For example, a computing device may be set to silent mode, but may include an override setting, such that the computing device may still audibly notify a user when receiving a call from a specified individual. In another example, text message notification may be enabled, however an override setting may disable notification at certain times or places.

In another embodiment, mode settings may include a mode of a user for the local device. For example, a configuration parameter may include a "busy" mode indicating that a user of the profile manager module 150 may be busy. A profile manager module 150 may also be configured to automatically response based on a mode of the user. For example, in response to a user being "busy," and a local device receiving a text message, the profile manager module 150 may automatically response to the text message with a message indicating the state of the "user." A user state may include available, busy, away, in a meeting, out to lunch, emergency only, do not disturb, or others, or the like.

In one embodiment, the profile manager module 150 may be configured to associate one or more remote devices with one or more configuration parameters. In one embodiment, a remote device may be associated with a setting. In one embodiment, the profile manager module 150 may store a list of remote devices. Each entry in the list of remote devices may be mapped to one or more configuration parameters. In another embodiment, the profile manager module 150 may store a list of configuration parameters. Each entry in the list of configuration parameters may be mapped to one or more remote devices. In another embodiment, a profile manager module 150 may store a list of remote devices and a list of configuration parameters. The profile manager module 150 may link entries in the list of remote devices with entries in the list of configuration parameters.

For example, a local device may be used by a local user. A remote mobile device may be used to administrator the local device. The local user may associate the remote mobile device with configuration parameters indicating a silent mode. In another example, a computing device may include a profile manager module 150. The profile manager module 150 may associate a remote device for a parent with a configuration parameter indicating a delay for text messages, or other setting.

In another embodiment, a profile manager module 150 may be configured to detect one or more of the remote devices wirelessly. In one embodiment, a profile manager module 150 may detect a remote device by receiving a signal from the remote device. In another embodiment, a profile manager module 150 may detect a remote device by a user indicating the presence of a remote device. In one embodiment, a profile manager module 150 may receive a transmission from a remote device including a device address, a device name, a device class, a list of services, or other technical information. In another embodiment, a profile manager 150 module may transmit a signal that requests other devices to identify themselves. Remote devices may be configured to respond to such inquiries. In another embodiment, the profile manager module 150 may respond to inquiries from remote devices, and may detect the remote devices based on the transmitted inquiry.

In one embodiment, the profile manager module 150 may be configured to set, on a local device, one or more configuration parameters associated with a detected remote device. The profile manager module 150 may match detected remote devices with configuration parameters and may set one or more configuration parameters that have been associated with the detected remote devices. As previously described, the configuration parameters may be any of the settings described in earlier paragraphs. In another embodiment, the profile manager module 150 may store a subset of configuration parameters, or any combination of configuration parameters.

In one embodiment, the profile manager module 150 may include an association module 160. The association module 160 may or may not perform substantially similar functions as the profile manager module 150. The association module 160 may be configured to associate one or more remote devices with one or more configuration parameters. In another embodiment, the remote devices may include mobile devices. In another embodiment, the association module 160 may store a priority for each of the remote devices. Priorities may include numerical priorities, such as 1 through 10. Priorities may also include textual priorities, such as, "high," "medium," "low," or other, or the like.

In one embodiment, a priority associated with remote devices may be based on the remote devices being associated with a group. For example, a specific remote device may be a member of a group "family." The remote device may be in the group "family" because a user of the remote device may be a family member of a user of the local device, although this is not necessarily the case. In another example, a remote device may be in the group "work" because a user of the remote device has a working relationship with a user of the local device. The association module 160 may define other groups. Remote devices may be members of one or more groups defined by the association module 160. In another embodiment, a remote device may not have a defined priority, however, a priority may be assigned to the remote device based on membership in a group. In one example, a remote device may be a cellular phone having a contacts list. A group may include remote devices associated with users included in the contact list. In another embodiment, a priority may be assigned to a remote device based on a property of a user of the remote device in a contact list of the local device 110.

In another embodiment, an association module 160 may communicate with a directory server, such as an Active Directory. The association module 160 may create groups based on properties of users included in the active directory. In one example, the association module 160 may create groups, such as, engineers, supervisors, manager, officers, or other, or the like, based on information obtained via a directory server. An association module 160 may create associations with the groups. For example, an association module 160 may associate a configuration parameter "silent" with remote devices associated with users who are in the "officers" group.

In another embodiment, an association module 160 may receive associations from remote devices. For example, an association module 160 may identify a remote device as a master device. The association module 160 may receive associations from the master remote device, and configure the associations on the local device. For example, a child may be user of a local device including an association module 160. The association module 160 may identify a parent's device as a master remote device. The parent's device may specify a set of configuration parameters to be assigned to the child's device. In one example, after a parent's device is detected by a child's device, the association module 160 of the child's device may receive updated associations from the parent's device. Therefore, a remote device may be configured to transmit associations to other devices. Or, an association module 160 may receive configuration parameters from remote devices and may associate those configuration parameters with the remote device. In another example, an association module 160 may receive associations from remote devices and my replicate the associations on the local device.

In another example, a parent may upload configuration settings for a child's device to a remote server. The child's device may be configured to periodically communicate with the remote server, and download associations indicated by the parent's device. A settings module 180 of the child's device may set the indicated associations when a detection module 170 detects a remote device included in the association.

In one embodiment, associations generated by an association module 160 may include times and locations. For example, the association module 160 may apply certain associations during a weekend, or specified other times. Specified other times may include, daytime, nighttime, weekdays, weekends, holidays, months, years, or other, or the like. In another example, the association module 160 may apply certain association based on a location. For example, at home, at work, in an automobile, in a country, in a state, on an airplane, or other, or the like. Location may be determined based on a detected remote device, such as, but not limited to, a wireless router, or the like. One skilled in the art may recognize other method for determining location, and this disclosure is intended to cover each of those methods.

In one embodiment, a profile manager module 150 may include a detection module 170. A detection module 170 may or may not perform substantially the same functions as the profile manager module 150. A detection module 170 may be configured to detect remote computing devices via any one of the described communication protocols. A detection module 170 may detect a remote device by receiving a transmission from the remote device.

In another embodiment, a detection module 170 may determine a distance between a local device and a remote device. In one example, a detection module 170 may measure a signal strength from a remote device. In another example, a Bluetooth protocol may support distance determination. A detection module 170 may request a distance from a. Bluetooth protocol. As one skilled in the art may appreciate, a distance may be determined by a variety of other methods that may or may not be described herein.

In one embodiment, a detection module 170 may determine a distance between a local device and a remote device, and may indicate a remote device is detected when the remote devices is within a threshold distance from the local device. For example, a threshold distance may be 10 feet. Of course, other distances may be used as a threshold distance and this disclosure is not limited in this regard. In one example, a detection module 170 may determine that a remote device is detected if the remote device is within 10 feet of the local device. In another example, the detection module 170 may determine that a remote device is not detected if the remote device is more than 20 feet from the detection module 170. Therefore, a detection module 170 may not indicate that a remote device is detected although signals from the remote device may be received by the detection module 170.

In another embodiment, a detection module 170 may determine multiple distances from a plurality of remote devices. For example, a detection module 170 may detect 10 remote devices or more, and may determine a distance to each of the 10 remote devices. In another example, a detection module 170 may determine a distance to 5 of the 10 detected remote devices. In one embodiment, associations between a local device and remote devices may be based on distance and the detection module 170 may determine a distance to such remote devices. In another embodiment, associations between a local device and remote devices may not be based on distance and the detection module 170 may not determine a distance to such remote devices.

In one embodiment, a detection module 170 may no longer detect a remote device after having detected the remote device. For example, a remote device may be moved out of the range of the detection module 170. In another example, a signal from a remote device may be attenuated by interference. A detection module 170 may continue to indicate that a remote device is detected although it may no longer be detected. In one example, a detection module 170 may indicate that a remote devices is detected for up to one minute after the remote device is no longer detected. Therefore, a detection module 170 may maintain that a remote device is detected although the remote device may oscillate in and out of range of the detection module 170.

In one embodiment, a detection module 170 may detect multiple remote devices, wherein at least one of the remote devices is detected via a different protocol than others of the multitude. For example, a detection module 170 may detect one remote device by a Bluetooth protocol, and another remote device by a Wi-Fi protocol. A detection module 170 may also detect multiple remote devices via multiple different protocols.

In one embodiment, a profile manager module 150 may include a settings module 180. A settings module 180 may or may not perform substantially the same functions as a profile manager module 150. In another embodiment, a settings module 180 may be configured to set, on a local device, one or more of the configuration parameters associated with a detected remote device.

In another embodiment, a settings module 180 may request associations from an associations module 160. In another embodiment, a settings module 180 may receive a plurality of associations from an associations module 160. In a further embodiment, an associations module 160 may receive a list of detected remote devices from the detection module 170. An associations module 160 may transmit a list of configuration parameters to a settings module 180. In one embodiment, the configuration parameters may be configuration parameters associated with detected remote devices.

In one embodiment, a settings module 180 may receive a set of configuration parameters from an associations module 160. Configuration parameters may conflict with each other. A settings module 180 may consolidate configuration parameters if there are conflicts between configuration parameters. In one example, a detection module 170 may detect a device A and a device B. An association may associate device A with a silent mode and another association may associate device B with a volume setting. Because a silent mode and a volume setting may be mutually exclusive, a settings module 180 may apply the silent mode, but may not apply the volume settings. Therefore, a settings module 180 may consolidate settings if there are conflicts between configuration parameters for detected remote devices.

In one embodiment, a settings module 180 may consolidate configuration parameters by applying the most restrictive configuration parameters. For example, where one configuration parameters indicates a volume settings of 10, and another configuration parameter indicates a volume settings of 5, a settings module 180 may apply the volume settings of 5 because it is the most restrictive configuration parameter.

In another embodiment, a settings module 180 may consolidate configuration parameters by applying a configuration parameters from a remote device that was detected before another remote device. For example, where there are conflicting configuration parameters associated with detected remote devices, and where a remote device A was detected before a device B, a settings module 180 may apply the configuration parameters associated with device A because it was detected earlier than device B.

In another embodiment, a settings module 180 may consolidate configuration parameters by applying configuration parameters associated with a detected remote device that has a higher priority. For example, where a remote device A and a remote device B are detected by a detection module 170, and where device A has a higher priority than device B, the settings module 180 may apply the configuration parameter associated with device A instead of device B because device A has a higher priority than device B.

In another embodiment, a settings module 180 may consolidate configuration parameters by applying configuration parameters associated with a detected remote device that is closer to the settings module 180 than other remote detected devices. For example, where a remote device A and a remote device B are detected by a detection module 170, and where device A has a distance of 5 meters, but device B has a distance of 10 meters, a settings module 180 may apply the configuration parameters associated with device A instead of device B because device A is closer to the settings module 180 than device B.

In one embodiment, a settings module 180 may consolidate configuration parameters by applying configuration parameters that are common with each of the detected remote devices. In one example, where there are conflicting configuration parameters, a settings module 180 may not apply any of the associated configuration parameters. In another example, where each of the detected remote devices includes an associated configuration parameters to be "silent," the settings module 180 may apply the "silent" setting because each of the detected remote devices is associated with the configuration parameter.

In another embodiment, a settings module 180 may apply configuration parameters associated with detected remote devices after the detected remote devices are detected to be within a threshold distance. For example, where a threshold distance is 3 meters, a settings module 180 may not apply configuration parameters associated with a detected remote device if the remote device has a distance of 5 meters. In another example, where a threshold distance is 14 feet, a settings module 180 apply configuration parameters associated with a detected remote device when the remote device has a distance of 14 feet or less.

In one example, an association module 160 may create a group of remote device that may include remote devices associated with a Wi-Fi network for an airline. A user of a profile manager module 150 may create associations between Wi-Fi devices for the airline with an "airplane mode" configuration parameter. Therefore, a profile manager module 150 may automatically put a local device in "airplane mode" (some communication capabilities disabled), when the detection module 170 detects one of the remote devices for the airline.

In another embodiment, a settings module 180 may receive override settings. Override settings may include configuration parameters that provide for temporary variations in the configuration parameters under some circumstances. In one example, an override settings may include multiple calls in a threshold period of time from another remote device. A settings module 180 may have applied a "silent" mode to a local device, however may have also applied an override setting that may indicate that if three or more calls are received from a unique user within a one minute threshold period, the "silent" mode may be temporarily overridden, and the local device may notify the user. In another example, an override setting may include a text message including a specific phrase. For example, a local device have been set to "silent" by a settings module 180, however the settings module 180 may have also applied an override setting that if a text message contains the text "emergency," then the silent mode may be temporarily overridden, and the user may be notified, contrary to the default configuration parameter of being in "silent" mode.

Figure 2:
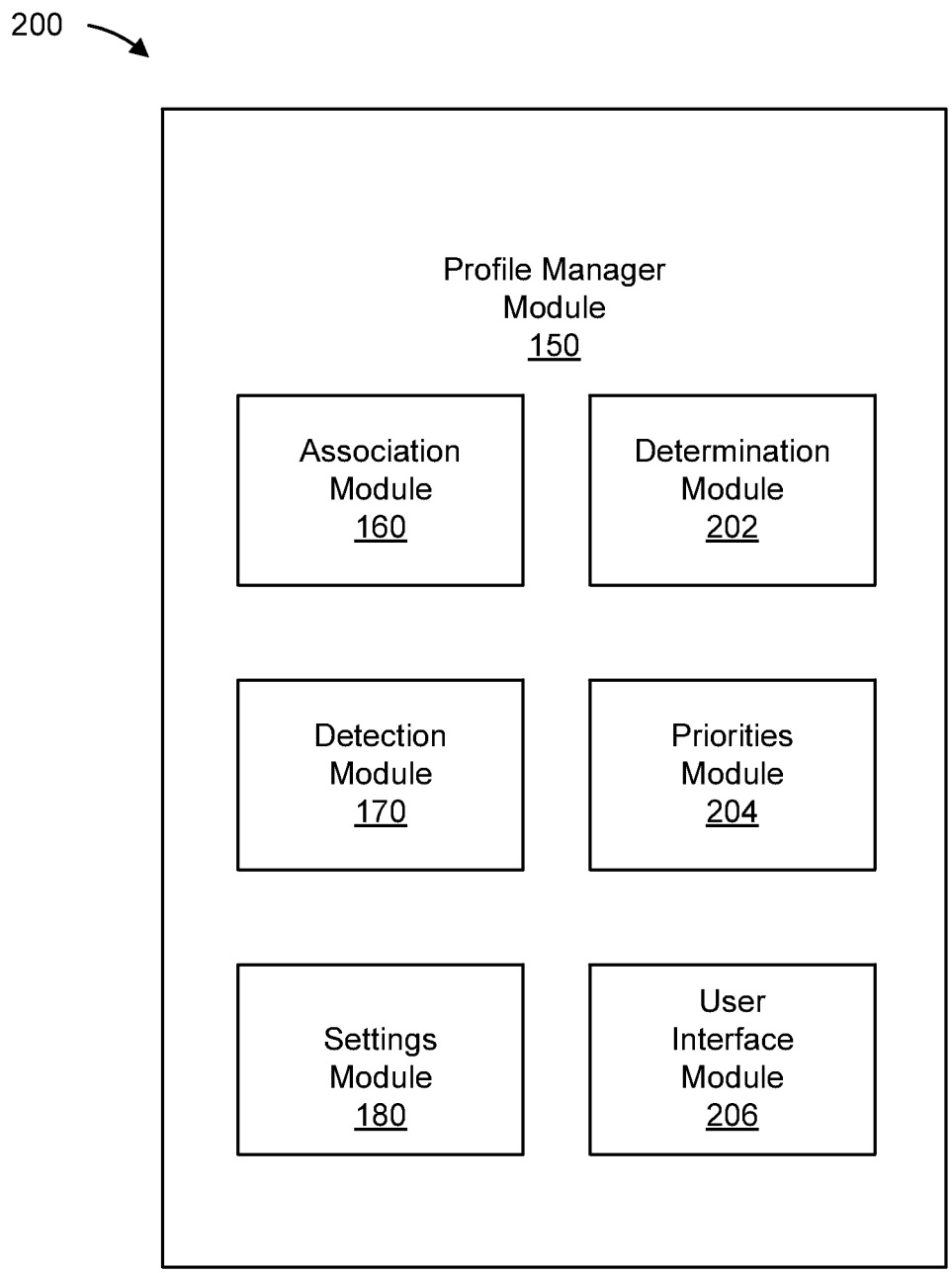
FIG. 2 is a schematic block diagram illustrating another embodiment of a profile manager module.

FIG. 2 is a schematic block diagram illustrating another embodiment 200 of a profile manager module 150. In one embodiment, the profile manager module 150 may include an association module 160, a detection module 170, a settings module 180, a determination module 202, a priorities module 204, and a user interface module 206. The association module 160, the detection module 170 and the settings module 180 may or may not be substantially identical to those depicted in FIG. 1.

In one embodiment, a profile manager module 150 may include a determination module 202. A determination module 202 may or may not perform substantially similar functions as the detection module 170, or the profile manager module 150 described in FIG. 1. In one embodiment, a determination module 202 may be configured to determine distances between the local device and one or more of the detected remote devices. As previously described regarding the detection module 170, the determination module 202 may determine a distance based on a signal strength, or based on a capability of a protocol. For example, a Bluetooth protocol may allow a determination module 202 to request a distance to other Bluetooth devices.

In another embodiment, a determination module 202 may periodically determine distances to detected remote devices. For example, a determination module 202 may recalculate distances to remote devices every 60 seconds. A determination module 202 may be configured to determine a change in one or more of the determined distances. Therefore, the determination module 202 may be configured to determine a change in a distance between a local device and a detected remote device. In one embodiment, in response to the determination module 202 determining a change in a distance, the settings module 180 may alter one or more configuration parameters for the local device.

In one embodiment, a profile manager module 150 may include a priorities module 204. A priorities module 204 may or may not perform substantially similar functions as the association module 160, or the profile manager module 150 described in FIG. 1. In one embodiment, the priorities module 204 may manage associations having a priority. In another embodiment, a settings module 180 may request a priority for an association from a priorities module 204

In one embodiment, a profile manager module 150 may include a user interface module 206. A user interface module 206 may or may not perform substantially similar functions as the profile manager module 150 described in FIG. 1.

In one embodiment, a user interface module 206 may be configured to request a response from a user of the local device. In one example, a detection module 170 may detect one or more remote devices 170. In response to detecting one or more remote devices, the user interface module 206 may request from the user, if the user desires the association configuration parameters to be applied. In one embodiment, a settings module 180 may be configured to set a configuration parameter based on the response from the user. For example, where a user indicates that the configuration parameters should be applied, the settings module 180 may apply the associated configuration parameters. In response to the user responding to NOT apply the associated configuration parameters, a settings module 180 may not apply the associated configuration parameters, although the associated remote devices may have been detected by the detection module 170.

In another embodiment, a user interface module 206 may provide an interface for a user to disable a currently applied configuration parameter. For example, a user interface module 206 may display a button to a user, whereby a user may remove applied configuration parameters based on associations with detected remote devices. In another example, a user interface module 206 may provide a button for a user to disable a current profile only temporarily. For example, a user interface module 206 may provide a button to disable a profile manager module 150 for 5 minutes. Of course, other times may be used.

In another embodiment, a user interface module 206 may provide a button for the profile manager module 150 to remember a current situation. A profile manager module 150 may create a group including each of the currently detected remote devices. A user may then use an interface, via a user interface module 206, to create some associations associated with the defined group. Further embodiments of a user interface are described relative to FIG. 7.

Figure 3A:
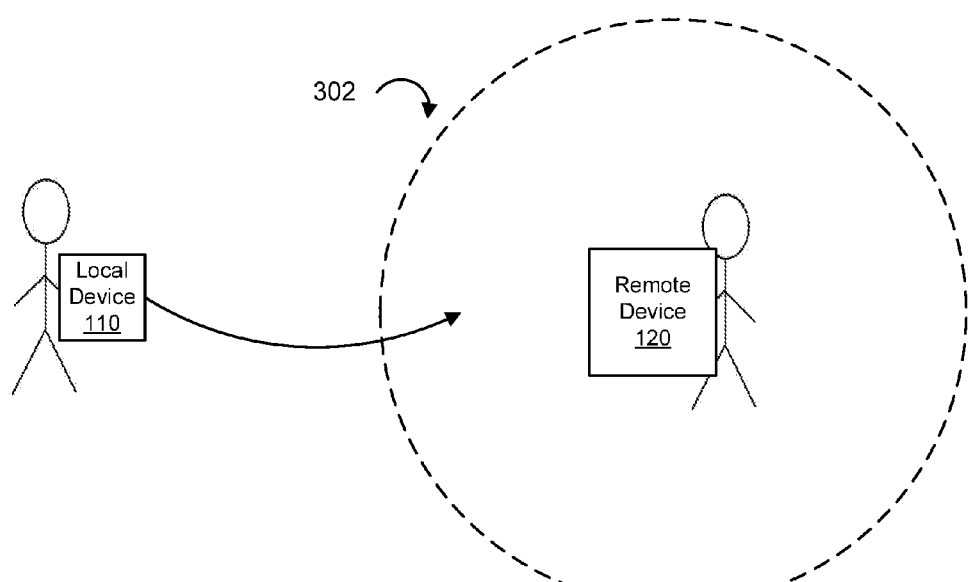
FIG. 3a is an illustration depicting one embodiment.

FIG. 3*a* is an illustration depicting one embodiment. FIG. 3*a* depicts a local device 110, a remote device 120 and a communication range depicted by circle 302. The circle 302 indicates a communication range 302 for the remote device 120. A local device 110 located outside of the communication range 302 may not be able to communicate with the remote device 120. A local device 110 located inside the communication range 302 of the remote device 120 may communicate with the local device 110.

FIG. 3*a* depicts a local device 110 moving from outside the communication range 302 to inside the communication range 320. Where the local device 110 was located outside of the communication range 302 of the remote device 120, a detection module 170 on a local device 110 may not detect the remote device 120. Where the local device 110 is located inside of the communication range 302 of the remote device 120, a detection module 170 on a local device 110 may detect the remote device 120.

Figure 3B:
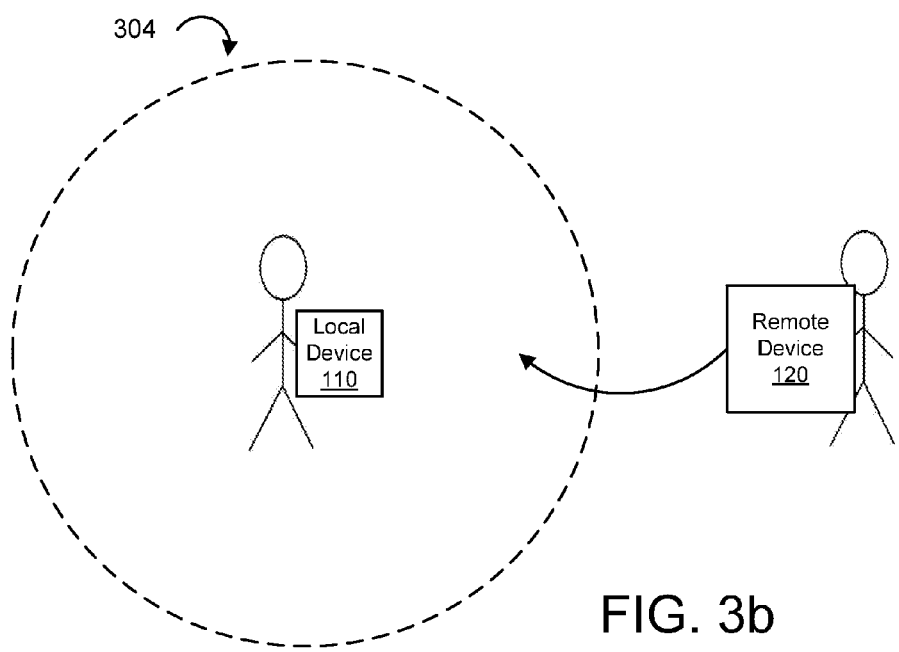
FIG. 3b is another illustration depicting another embodiment.

FIG. 3*b* is another illustration depicting one embodiment. FIG. 3*b* depicts a local device 110, a remote device 120 and a communication range depicted by circle 304. The circle 304 indicates a communication range 304 for the local device 110. A remote device 120 located outside of the communication range 304 may not be able to communicate with the local device 110. A remote device 120 located inside the communication range 304 of the local device 110 may communicate with the remote device 120. Therefore, as depicted in FIGS. 3*a* and 3*b*, a detection module 170 may detect a remote device regardless if the local device 110 moves into a communication range 302 of a remote device 120, or a remote device 120 moves into a communications range 304 of a local device 110.

Figure 4:
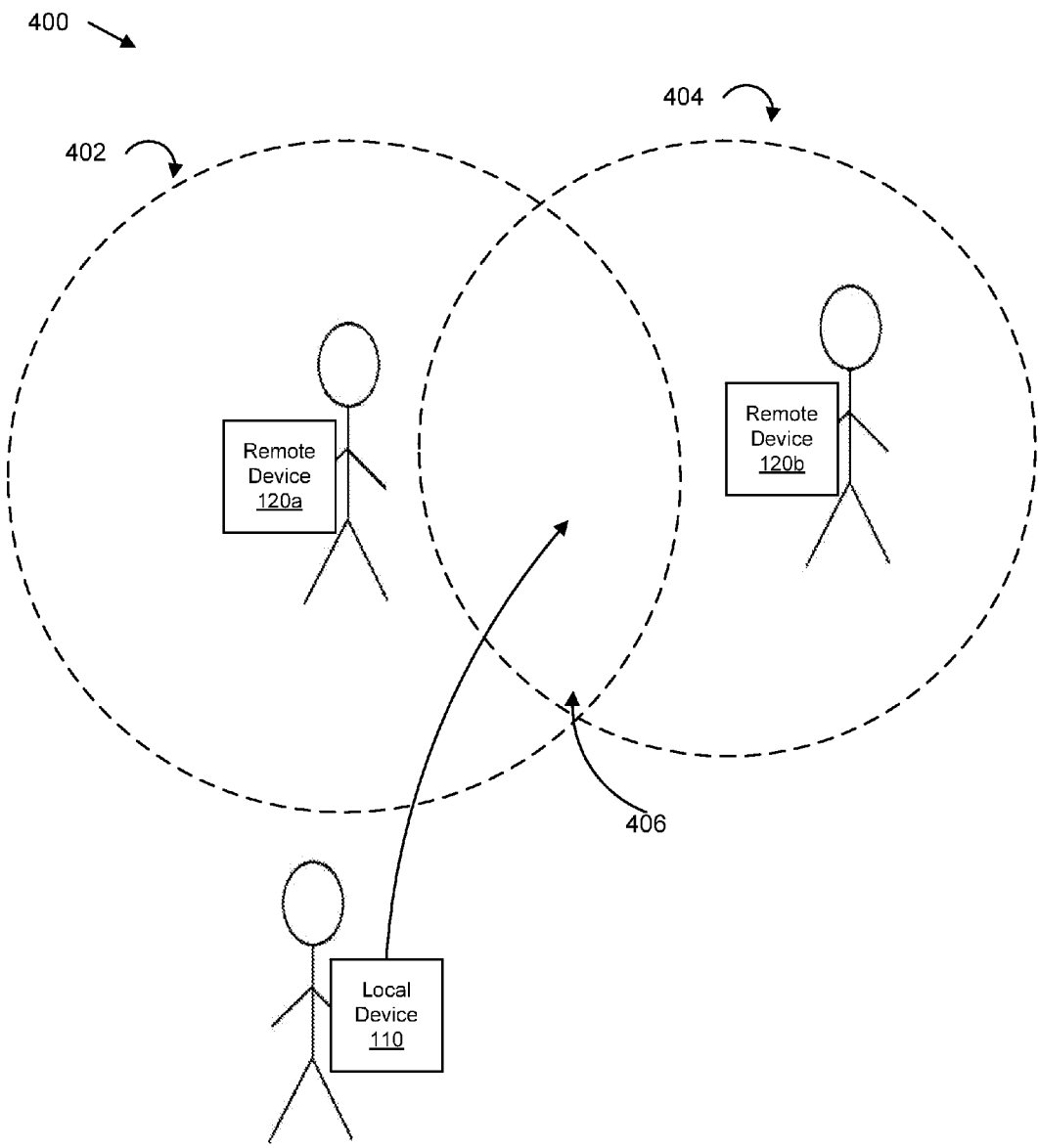
FIG. 4 is an illustration depicting an embodiment comprising two remote devices.

FIG. 4 is a diagram illustrating one embodiment comprising two remote devices 120*a*, 120*b*. As previously described regarding FIG. 3, a remote device 120*a* may have a communication range depicted by a circle 402. A remote device 120*b* may have a communication range depicted by circle 404. A local device 110 may move from a location outside of either communication range 402,404 and to a location 406 that is within range of both communication circles 402,404. In one embodiment, a settings module 180 may consolidate configuration parameters associated with devices 120*a* and 120*b*, as previously described. In one example, a settings module 180 may consider a priority of remote devices 120*a* and 120*b*. In another example, because the local devices came within range of the remote device 120*a* before remote device 120*b*, the settings module 180 may apply settings associated with remote device 120*a* above configuration parameters associated with remote device 120*b*.

In another embodiment, a settings module 180 may combine configuration parameters associated with each of the remote devices 120*a*, 120*b* as previously described. In another embodiment, a settings module 180 may apply configuration parameters that are associated in common with both remote devices 120*a* and 120*b* as previously described.

Figure 5:
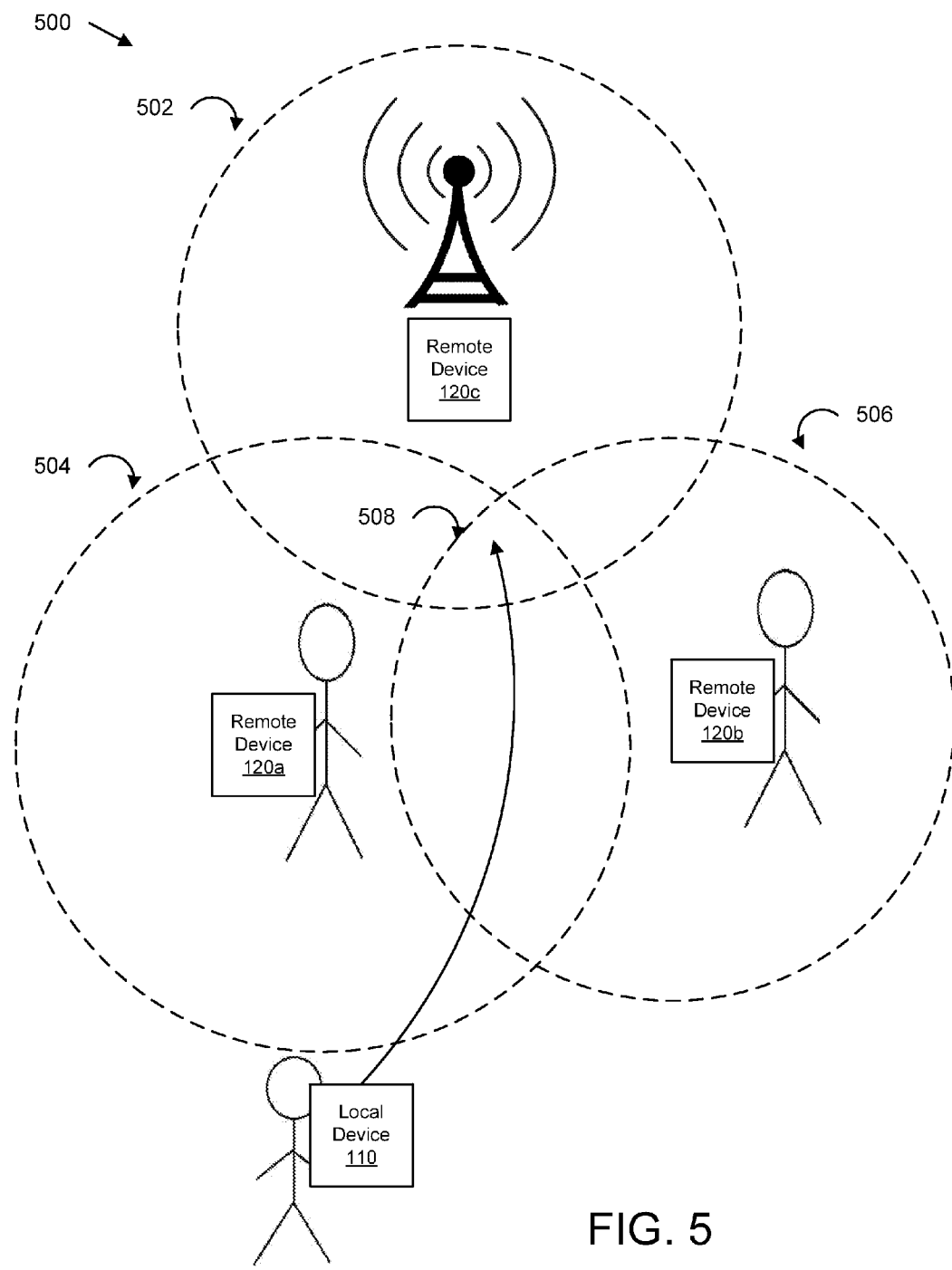
FIG. 5 is an illustration depicting one embodiment comprising three remote devices.

FIG. 5 is a diagram illustrating one embodiment 500 comprising three remote devices. As in previous figures, circles

502, 504, 506 indicate respective communication ranges for remote devices 120c, 120a, and 120b. Remove device 120c may be a wireless router. Remote devices 120a and 120b may be mobile devices. Therefore, in one embodiment, remote devices detected by the detection module 170 may be different types of devices.

In another embodiment, an association module 160 may create or receive associations between remote devices 120 and configuration parameters. In one embodiment, local device 110 may move to a location that is within a communication range 508 of remote devices 120. A settings module 180 may set, on the local device 110, one or more of the configuration parameters associated with the remote devices 120.

In another embodiment, a settings module 180 may consolidate configuration parameters as previously described. In one example, a settings module 180 may apply configuration parameters associated with remote device 120a because the local device 110 may enter a communication range for remote device 120a before entering a communication range for remote device 120b. In another example, a settings module 180 may apply configuration parameters associated with remote device 120b before applying configuration parameters associated with remote device 120a because remote device 120b has a higher priority than remote device 120a. In another example, a settings module 180 may apply configuration parameters that are associated in common with detected remote devices 120.

For example, remote device 120a, 120b, and 120c may each be associated with a configuration parameter indicating a volume level of 5. Because each of the remote devices 120 may be associated with the configuration parameters indicating a volume of 5, a settings module 180 may apply the configuration parameter. If no other common configuration parameters are associated in common with the remote devices 120, a settings module 180 may not apply additional configuration parameters.

In another example, a settings module 180 may apply configuration parameters that are associated with any of the detected remote devices 120. In one example, remote device 120a may be associated with a silent mode. Remote device 120b may be associated with a delay for text messages. Remote device 120c may be associated with an override setting to notify when a call from a specific user is received. A settings module 180 may apply the three configuration parameters. The local device 110 may be silent, may delay text messages, but may still notify a user when a call is received from the specified user.

Figure 6:
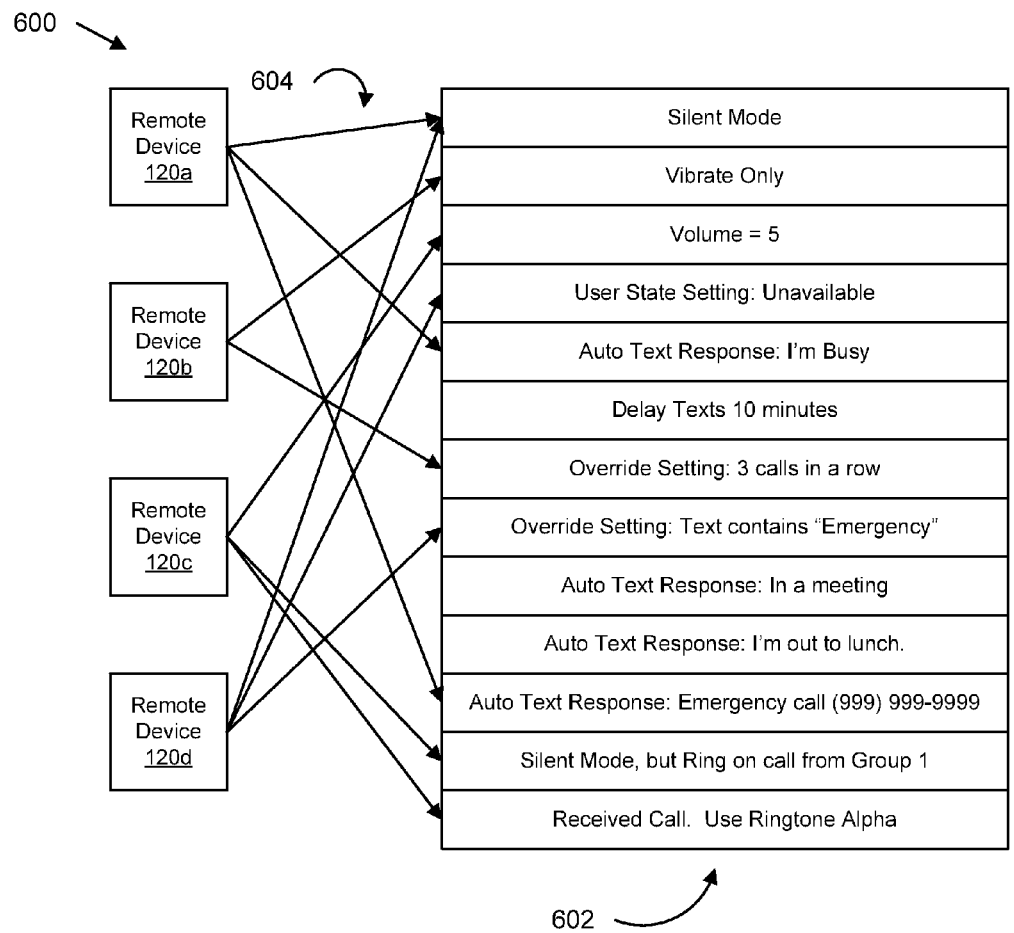
FIG. 6 is a diagram illustrating one embodiment of a linking table.

FIG. 6 is a diagram illustrating one embodiment 600 of a linking table. An association module 160 may associate, on a local device 110, remote devices 120 with configuration parameters in a table 602. A table 602 may include many configuration parameters or settings. Of course many more configuration parameters may be used and this disclosure is not limited in this regard. An association module 160 may create a linking table that includes hundreds, thousands or more configuration parameters. An association module 160 may link 604 remote devices 120 with configuration parameters in the table 602.

For example, as depicted in FIG. 6, remote device 120a may be linked 604 to "silent mode," "auto text response: 'I'm busy,'" and "auto text response: Emergency call (999) 999-9999." Remote device 120b may be associated with "vibrate only," and an override setting "3 calls in a row." Remote device 120b may vibrate only, however, if 3 calls in a row are received from a user, a local device 110 may audibly notify a user of the local device 110. Remote device 120c may be associated with a volume level of five, a silent mode with an override setting to ring on a call from a user of group 1, and to use ringtone "alpha" on a received call from a user of group 1. Remote device 120d may be associated with configuration parameters to be in "silent" mode, set a user state to "unavailable," and an override setting to audibly notify a user if a text message contains the text "emergency."

Figure 7A:
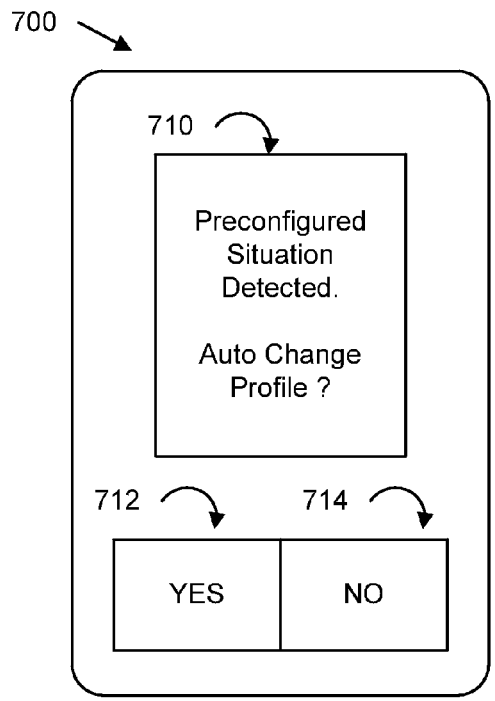
FIG. 7a includes one embodiment of a user interface.

FIG. 7a includes an illustration depicting one embodiment 700 of a user interface. In one embodiment, a user interface module 206 may be configured to request a response from a user of a local device 110. In one embodiment, where a detection module 170 detects remote devices 120, a user interface module 206 may display a message notifying a user that a preconfigured situation is detected. A preconfigured situation may include a scenario where the detected remote devices 120 are associated with match associations with configuration parameters. A user interface module 206 may ask a user if the profile manager module 150 should change the profile, or change the applied set of configuration parameters based on a detection module 170 detecting a set of remote devices 120.

In one example, in response to a user selecting "yes" 712, a settings module 180 may not apply the associated configuration parameters. In another example, in response to a user selecting "no" 714, a settings module 180 may apply the configuration parameters associated with the detected remote devices. A settings module may also consolidate conflicting configuration parameters as previously described.

Figure 7B:
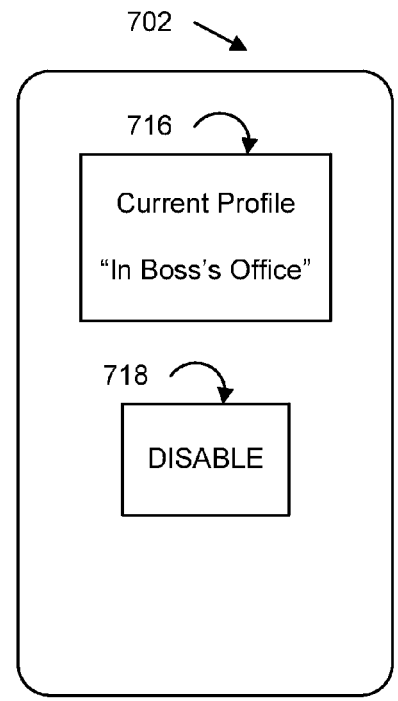
FIG. 7b includes one embodiment of a user interface.

FIG. 7b includes an illustration depicting one embodiment 702 of a user interface. In one embodiment, a user interface module 206 may display a message to a user that a current profile is active. An active profile may mean that a set of configuration parameters associated with currently detected remote devices have been applied. In one embodiment, a user interface module 206 may provide a button to a user that may disable the current profile.

In one example, a profile manager module 150 may have automatically applied a profile "In Boss's Office." A profile as described herein, may mean a set of configuration parameters associated with a currently detected set of remote devices 120. In one example, a user may select a button to disable a current profile. In response to a user selecting the button, a profile manager module 150 may un-apply configuration parameters that have been applied based on a currently detected scenario. In response to a user selecting the "disable" button, a local device 110 may be in a default state, or may revert to a previously applied profile.

Figure 7C:
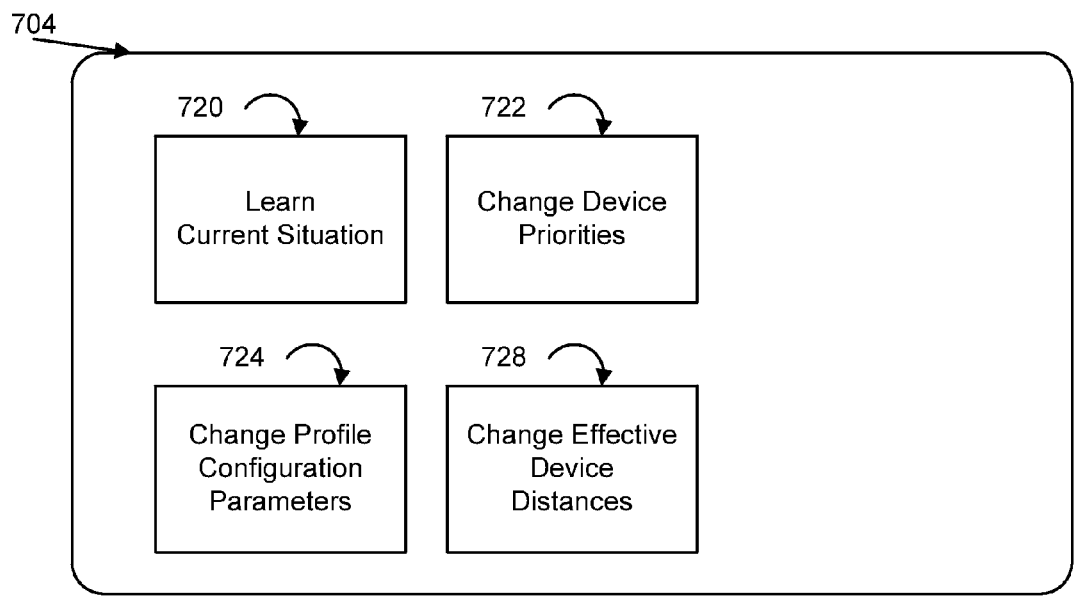
FIG. 7c includes one embodiment of a user interface.

FIG. 7c includes an illustration depicting one embodiment 704 of a user interface. In one embodiment, a user interface module 206 may several buttons 720,722,724,728. One button 720, when pressed by a user, may learn a current situation. For example, in response to a user selecting the button 720, a profile manager module 150 may place currently detected remote devices into a group. An association module 160 may then assign configuration parameters to the group. In this way, a user may easily create groups of remote devices 120.

In one embodiment, configuration parameters associated with the group may be applied if any one remote device that is a member of the group is detected by the detection module 170. In another embodiment, configuration parameters associated with the group may be applied if all of the members of the group are currently detected by the detection module 170.

In one embodiment, a user interface module 206 may display a button 722 to change remote device priorities. For example, in response to a user selecting the button 722, a user interface module 206 may provide a graphical display allowing a user to adjust a priority for remote devices 120.

In another embodiment, a user interface module 206 may display a button 724 to change profile configuration parameters. For example, in response to a user selecting the button 724, a user interface module 206 may provide a graphical display allowing a user to adjust, modify, add, remote, or the like, configuration parameters associated with remote devices 120.

In another embodiment, a user interface module 206 may display a button 728 to change effective device distances. For example, in response to a user selecting the button 728, a user interface module 206 may provide a graphical display allowing a user to adjust or modify effective distances for remote devices 120. In one example, a user may set a remote device's effective distance to 5 meters. In response to a user setting this effective distance, a settings module 180 may not apply configuration parameters associated with a detected remote device 120 until the remote device 120 is within 5 meters of the local device 110. In other embodiment, a user interface module 206 may provide other ways for a user to adjust, edit, modify, add, or remote configuration parameters, as one skilled in the art may appreciate.

Figure 8:
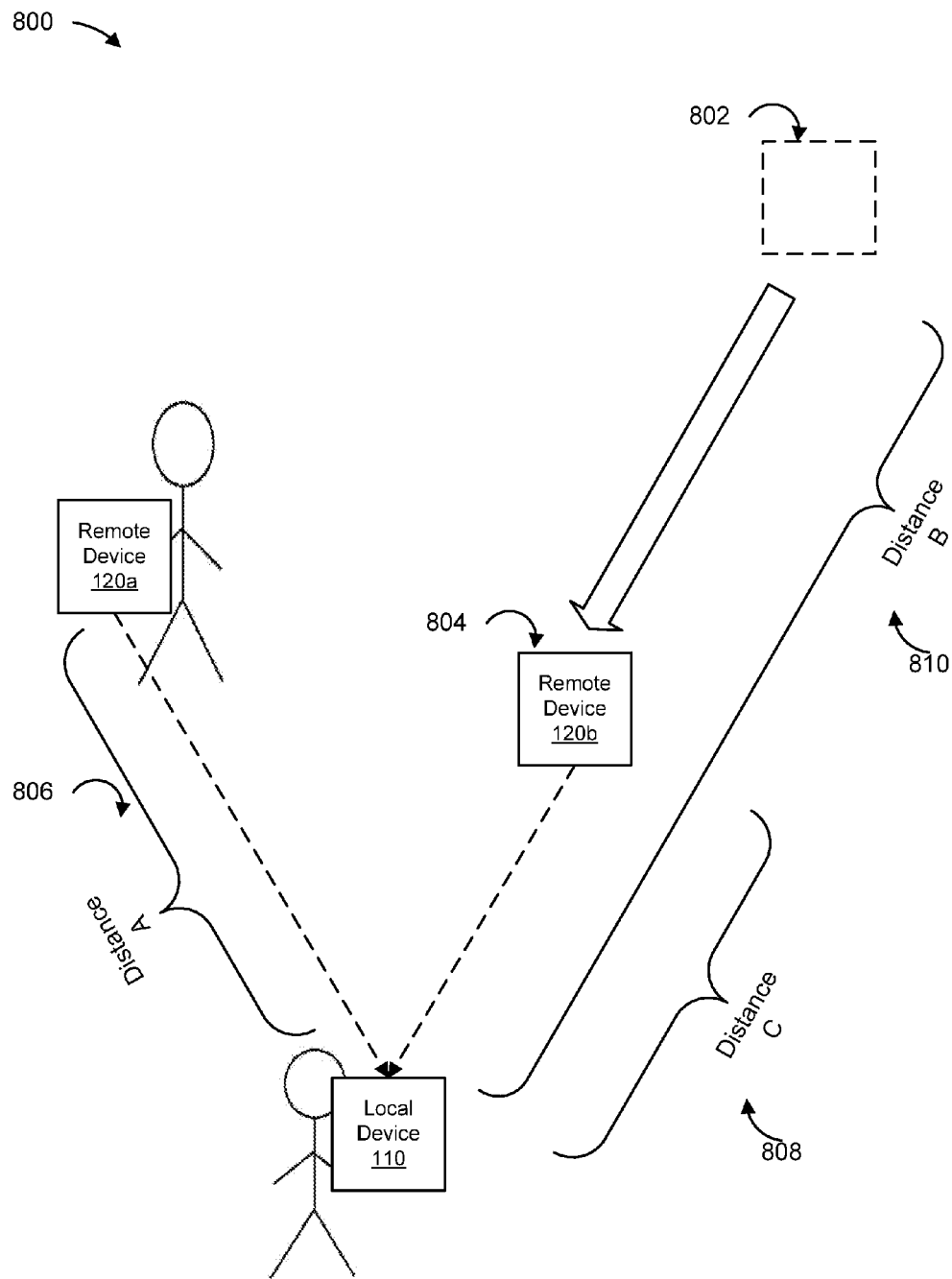
FIG. 8 is an illustration depicting one embodiment.

FIG. 8 is an illustration depicting one embodiment 800. In one embodiment, a local device 110 may be in a proximity to remote devices 120*a* and 120*b*. Initially, remote device 120*b* may be in a location 802 that is distance B 810 away from the local device 110. The remote device 120*b* at a location 802 may or may not be within a communication range of the local device 110. In one embodiment, a profile manager module 150 on the local device 110 may cause configuration parameters associated with the remote device 120*a* to be applied, however a profile manager module 150 may not cause configuration parameters associated with remote device 120*b* at location 802 to be applied.

In one embodiment, in response to remote device 120*b* moving closer to local device 110, to a location 804 at a distance C 808 from the local device 110, a detection module 170 may indicate that remote device 120*b* is closer to the local device 110 than remote device 120*a*. For example, distance C 808 may be less than distance A 806. In another embodiment, in response to remote device 120*b* moving closer to the local device 110 than remote device 120*a*, a profile manager module 150 may un-apply configuration parameters associated with remote device 120*a*, and apply configuration parameters associated with remote device 120*b*. In another embodiment, in response to remote device 120*b* moving closer to the local device 110 than remote device 120*a*, a profile manager module 150 may additionally apply configuration parameters associated with remote device 120*b*, such that configuration parameters associated with either remote device 120*a* or 120*b* may be applied. In another embodiment, in response to remote device 120*b* moving closer to the local device 110 than remote device 120*a*, a profile manager module 150 may un-apply configuration parameters associated with remote device 120*a*, and apply configuration parameters that are commonly associated with both remote device 120*a* and 120*b*.

Figure 9:
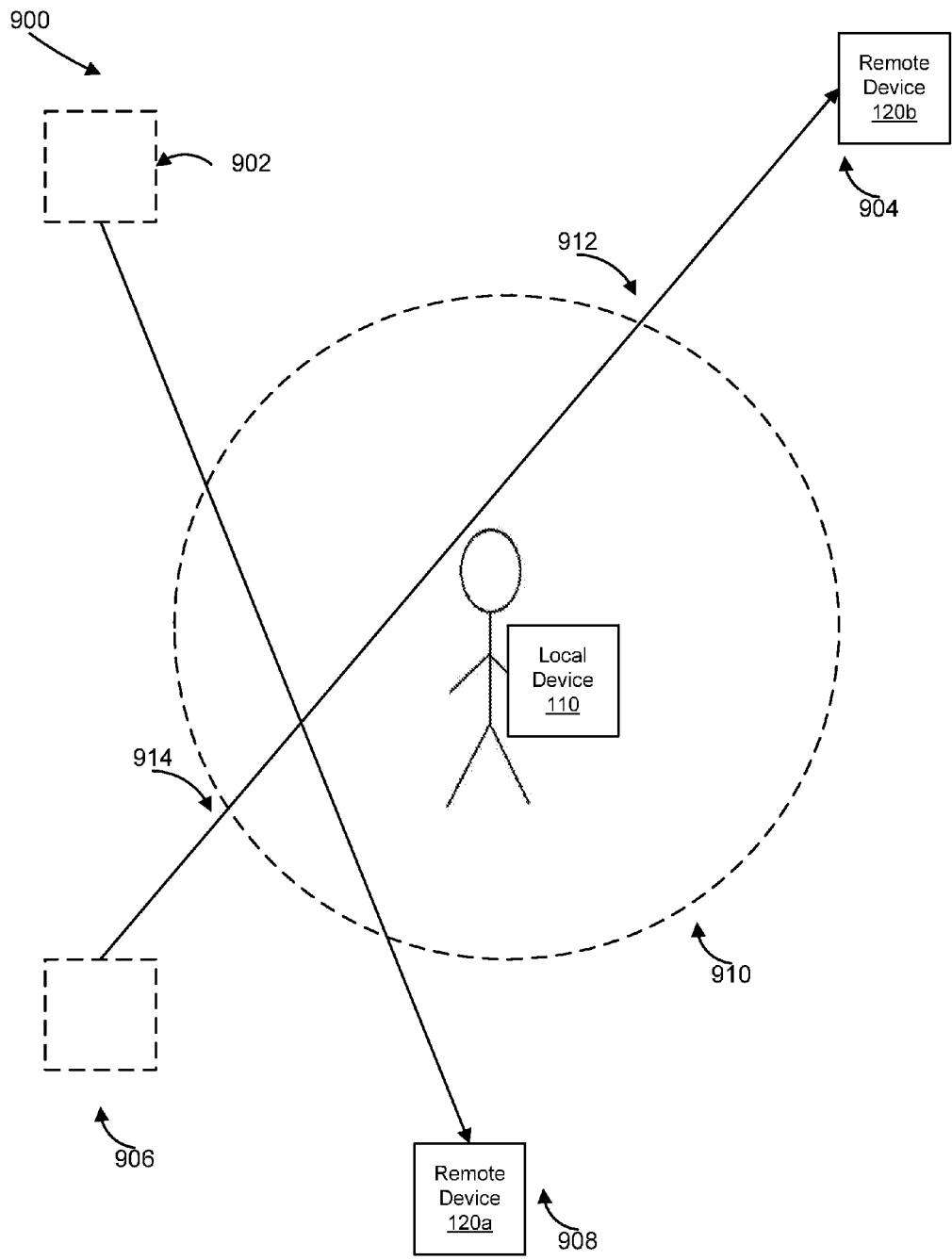
FIG. 9 is an illustration depicting one embodiment.

FIG. 9 is an illustration depicting one embodiment 900. As previously described, a local device 110 may have a communication range 910 depicted by a circle with a dotted line. A remote device 120*a* may initially be in a location 908 outside of the communication range 910 of the local device 110. A remote device 120*b* may initially be in a location 904 outside of the communication range 910 of the local device 110.

In one embodiment, remote device 120*a* may move from location 902 to location 908. The remote device 120*a* may move through the communication range 910 of the local device 110. In response to the remote device 120*a* moving within a communication range 910 of the local device 110, a detection module 170 may detect the remote device 120*a*. A settings module 180 may apply configuration parameters associated with the remote device 120*a* to the local device 110. In response to the remote device 120*a* moving out of the communication range 910 of the local device 110, a detection module 170 may indicate that the remote device 120*a* is no longer detected. A settings module 180 may un-apply, revoke, or retract configuration parameters associated with the remote device 120*a* on the local device 110.

In another embodiment, remote device 120*b* may move from location 906 to location 904. The remote device 120*b* may move through the communication range 910 of the local device 110. In response to the remote device 120*a* moving within 914 a communication range 910 of the local device 110, a detection module 170 may detect the remote device 120*b*. A settings module 180 may apply configuration parameters associated with the remote device 120*b* to the local device 110. In response to the remote device 120*b* moving out 912 of the communication range 910 of the local device 110, a detection module 170 may indicate that the remote device 120*b* is no longer detected. A settings module 180 may un-apply, revoke, or retract configuration parameters associated with the remote device 120*a* on the local device 110.

In another embodiment, remote device 120*a* and 120*b* may enter a communication range 910 of the local devices at substantially the same time. In one embodiment, remote device 120*a* may enter a communication range 910 of the local device at different times, but may leave the communication range 910 at substantially similar times. A settings module 180 may consolidate configuration parameters that may conflict between remote device 120*a* and 120*b*. In one embodiment, a determination module 202 may In one embodiment, remote devices 120*a* and 120*b* may be members of a group. In response to remote devices 120*a* and 120*b* entering a communication range 910 of the local device, a settings module 180 may set configuration parameters associated with any of 120*a* or 120*b*, or may set configuration parameters that are commonly associated with remote devices 120*a* and 120*b*.

Figure 10:
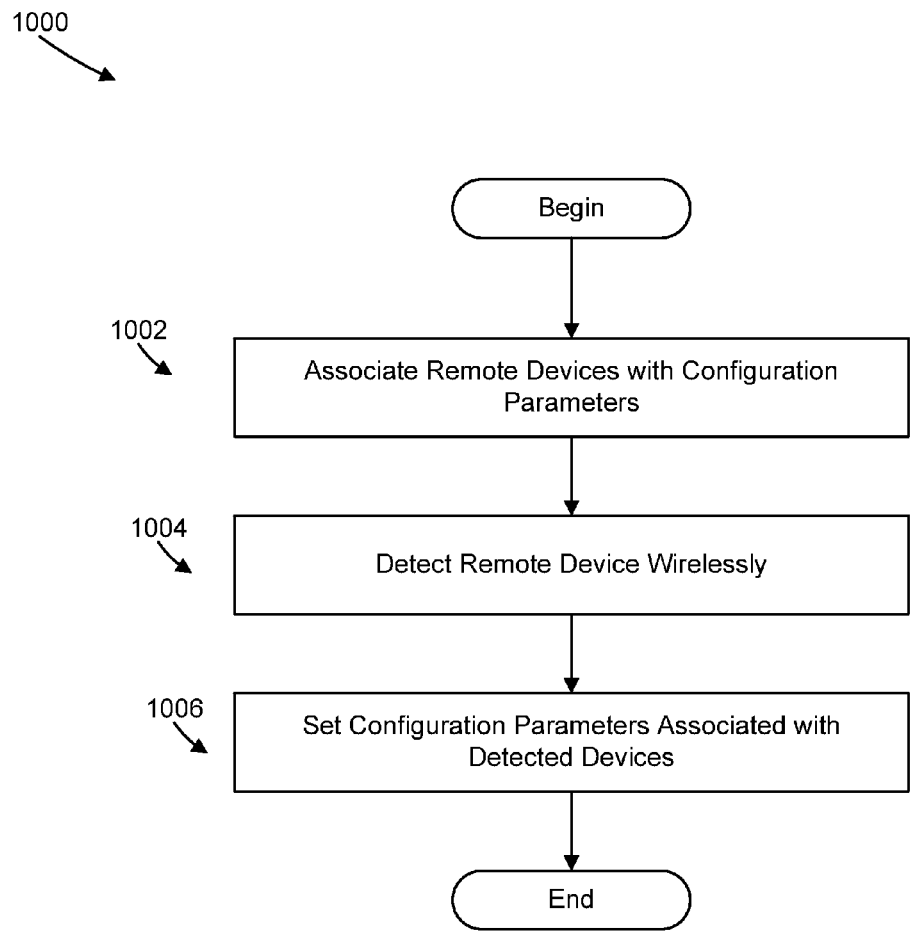
FIG. 10 is a schematic flow chart diagram illustrating one embodiment of a method.

FIG. 10 is a schematic flow chart diagram illustrating one embodiment 1000 of a method. The method beings and an association module 160 may associate 1002 remote devices with configuration parameters. A detection device 170 may detect 1004 remote devices wirelessly. A settings module 180 may set 1006 configuration parameters associated with detected remote devices and the method may end.

Figure 11:
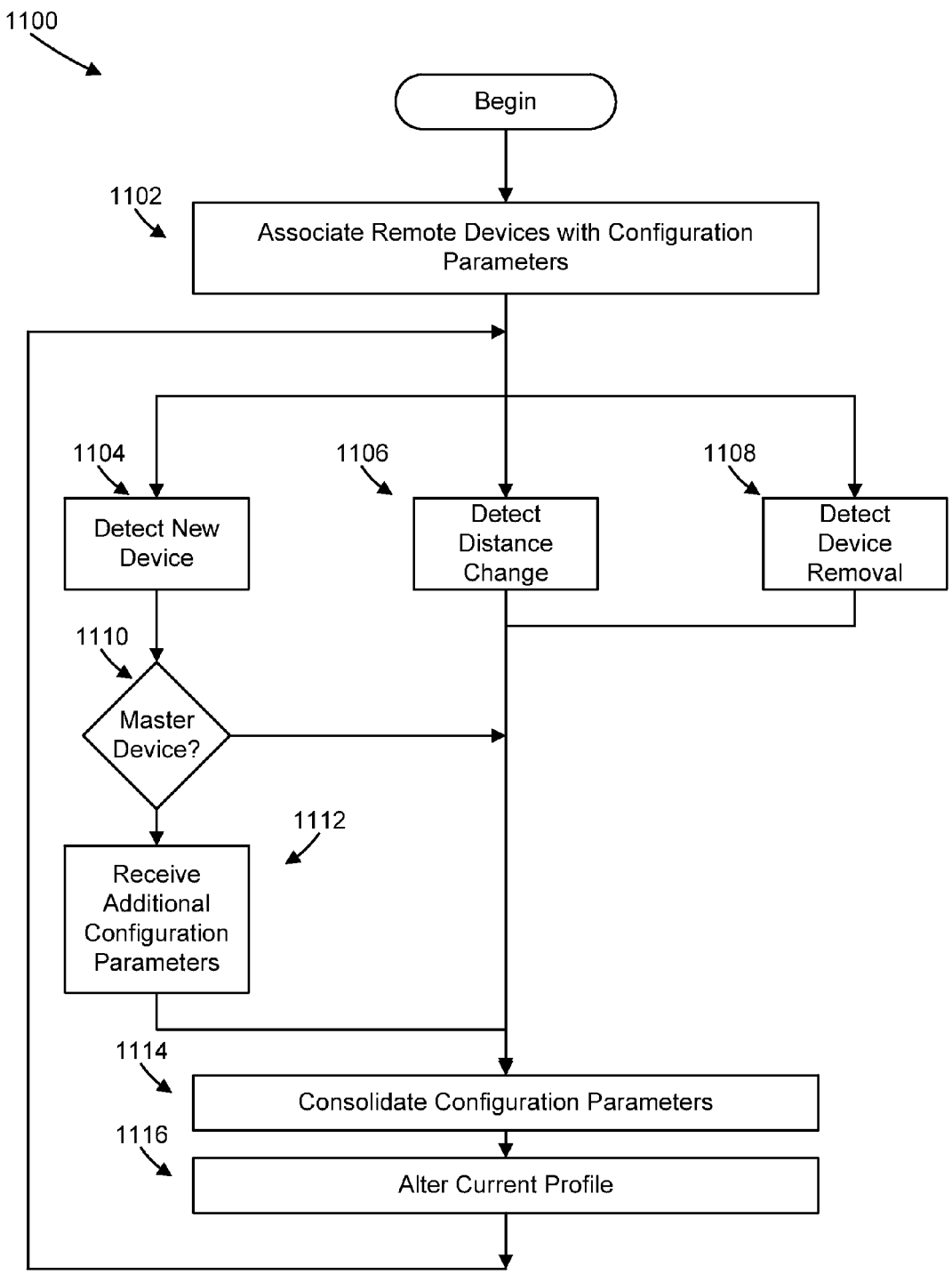
FIG. 11 is a schematic flow chart diagram illustrating one embodiment of another method.

FIG. 11 is a schematic flow chart diagram illustrating one embodiment 1100 of another method. In one embodiment, the method begins and an association module 160 may associate remote devices with configuration parameters.

In one embodiment, a detection module 170 may detect 1104 a new remote device. A profile manager module 150 may determine if the new remote device is a master device. If the new device is not a master device, a settings module 180 may integrate or consolidate 1114 configuration parameters associated with the new device. A profile manager module 150 may alter 1116 a current profile based on the new detected remote device. If the new device is a master device, an association module 160 may receive 1112 additional configuration parameters from the master device. A settings module 180 may integrate or consolidate 1114 configuration parameters associated with the new master remote device and the received configuration parameters. A profile manager module 150 may alter 1116 a current profile based on the new detected remote device.

In another embodiment, a determination module 202 may detect a change in a distance between a detected remote device 120 and a local device 110. In one embodiment, where remote devices 120 have effective distances, a settings module 180 may consolidate configuration parameters. For example, where a remote device moves within an effective distance, a settings module 180 may apply configuration parameters associated with the remote device. In another example, a determination module 202 may detect a change in distance between a detected remote device 120 and a local device 110, but may not indicate that the remote device is detected if the remote device is still further from the local device that the effective distance. In another embodiment, a determination module 202 may detect a change in distance between a detected remote device 120 and a local device 110, but a settings module 180 may not apply the associated configuration parameters if the remote device is still further away from the local device that the effective distance.

In another embodiment, a detection module 170 may detect that a remote device that was previously detected, is no longer detected. A settings module 180 may revoke configuration parameters associated with the remote device. In another example, a settings module 180 may consolidate configuration parameters based on the remote device not being detected.

In another embodiment, a detection module 170 may indicate that a remote device is no longer detected if a determination module 202 determines that the remote device is outside of an effective distance for the remote device. As previously described, a settings module 180 may consolidate or integrate configuration parameters based on the remote device no longer being detected. A profile manager module 150 may alter a current profile for the local device.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a processor;
    a memory storing machine readable code executable by the processor, the machine readable code comprising:
    an association module configured to associate one or more remote devices with one or more configuration parameters, the remote devices comprising one or more mobile devices;
    a detection module configured to detect one or more of the remote devices wirelessly;
    a settings module configured to set, on a local device, one or more of the configuration parameters associated with a detected remote device; and
    a priorities module configured to determine whether the detected remote device is a master remote device, and further configured to receive additional configuration parameters from the master remote device in response to determining that the detected remote device is a master remote device,
    wherein the settings module is further configured to set the additional configuration parameters in response to determining that the detected remote device is a master remote device, and otherwise set the one or more of the configuration parameters associated with the detected remote device without receiving additional configuration parameters.

2. The apparatus of claim 1, further comprising a determination module configured to determine distances between the local device and one or more of the detected remote devices, and wherein the settings module is further configured to set one or more configuration parameters based on one or more remote devices being within a threshold distance.

3. The apparatus of claim 2, wherein the determination module is further configured to determine a change in one or more of the determined distances, and the settings module is further configured to alter one or more of the configuration parameters based on the determined change.

4. The apparatus of claim 1, wherein one or more of the detected remote devices is a member of a group, and wherein the settings module is further configured to set one or more configuration parameters associated with the group.

5. The apparatus of claim 1, where one or more of the configuration parameters comprises one of a notification setting, an override setting, and a state setting.

6. The apparatus of claim 1, wherein the one or more remote devices comprises a plurality of remote devices, respective remote devices of the plurality having a priority, and wherein the setting module is further configured to set a configuration parameter associated with a remote device having a higher priority that other remote devices of the plurality in response to a conflict between configuration parameters.

7. The apparatus of claim 1, further comprising a user interface module configured to request a response from a user of the local device, and wherein the settings module is further configured to set a configuration parameter based on the response.

8. A method comprising:
    associating one or more remote devices with one or more configuration parameters, the remote devices comprising one or more mobile devices;
    detecting one or more of the remote devices wirelessly;
    setting, on a local device, one or more of the configuration parameters associated with a detected remote device;
    identifying one or more of the remote devices as a master remote device; and
    receiving additional configuration parameters from the master remote device in response to determining that the detected remote device is a master remote device,
    wherein the setting, on the local device, one or more configuration parameters comprises setting the additional configuration parameters in response to determining that the detected remote device is a master remote device, and otherwise setting one or more of the configuration parameters associated with the detected remote device without receiving additional configuration parameters.

9. The method of claim 8, further comprising:
    determining distances between the local device and one or more of the detected remote devices, and wherein the setting one or more configuration parameters is further based on one or more detected remote devices being within a threshold distance.

10. The method of claim 9, further comprising:
    determining a change in one or more of the determined distances; and
    altering one or more of the configuration parameters based on the determined change.

11. The method of claim 8, wherein one or more detected remote devices is a member of a group, and wherein the setting one or more configuration parameters comprising setting one or more configuration parameters associated with the group.

12. The method of claim 8, wherein setting one or more configuration parameters comprises one of setting a notification setting, setting an override setting, and setting a state of a user of the local device.

13. The method of claim 8, wherein the detecting one or more remote devices comprises detecting a plurality of remote devices, respective remote devices of the plurality having a priority, and wherein the setting one or more configuration parameters comprises setting a configuration parameter associated with a remote device having a higher priority than other remote devices of the plurality in response to a conflict between one or more configuration parameters.

14. The method of claim 8, further comprising:
requesting a response from a user of the local device, and wherein the setting one or more configuration parameters is further based on the response.

15. A program product comprising a computer readable storage medium storing machine readable code executable by a processor to perform the operations of:
associating one or more remote devices with one or more configuration parameters, the remote devices comprising one or more mobile devices;
detecting one or more of the remote devices wirelessly;
determining whether a detected remote device is a master remote device;
receiving additional configuration parameters from the master remote device in response to determining that the detected remote device is a master remote device; and
setting, on a local device, one or more of the configuration parameters associated with the detected remote device, wherein the setting, on the local device, one or more configuration parameters comprises setting the additional configuration parameters in response to determining that the detected remote device is a master remote device, and otherwise setting one or more of the configuration parameters associated with the detected remote device without receiving additional configuration parameters.

16. The program product of claim 15, wherein the operations further comprise determining distances to one or more of the detected remote devices, and wherein the setting one or more configuration parameters is further based on one or more detected remote devices being within a threshold distance.

17. The program product of claim 15, wherein the operation of detecting one or more remote devices comprises detecting a plurality of remote devices, respective remote devices having a priority, and wherein the setting one or more configuration parameters comprises setting a configuration parameter associated with a remote device of the plurality, the remote device of the plurality having a higher priority that other remote devices of the plurality in response to a conflict between configuration parameters.

18. The program product of claim 15, the operations further comprising requesting a response from a user of the local device, and wherein the setting one or more of the configuration parameters is based on the response.

* * * * *